May 23, 1967 W. E. BOWE 3,321,108
PRINTING INK DISPENSER
Filed Nov. 26, 1965 3 Sheets-Sheet 1

INVENTOR.
WILLIAM E. BOWE
BY Lothrop & West
ATTORNEYS

May 23, 1967  W. E. BOWE  3,321,108
PRINTING INK DISPENSER
Filed Nov. 26, 1965  3 Sheets-Sheet 2
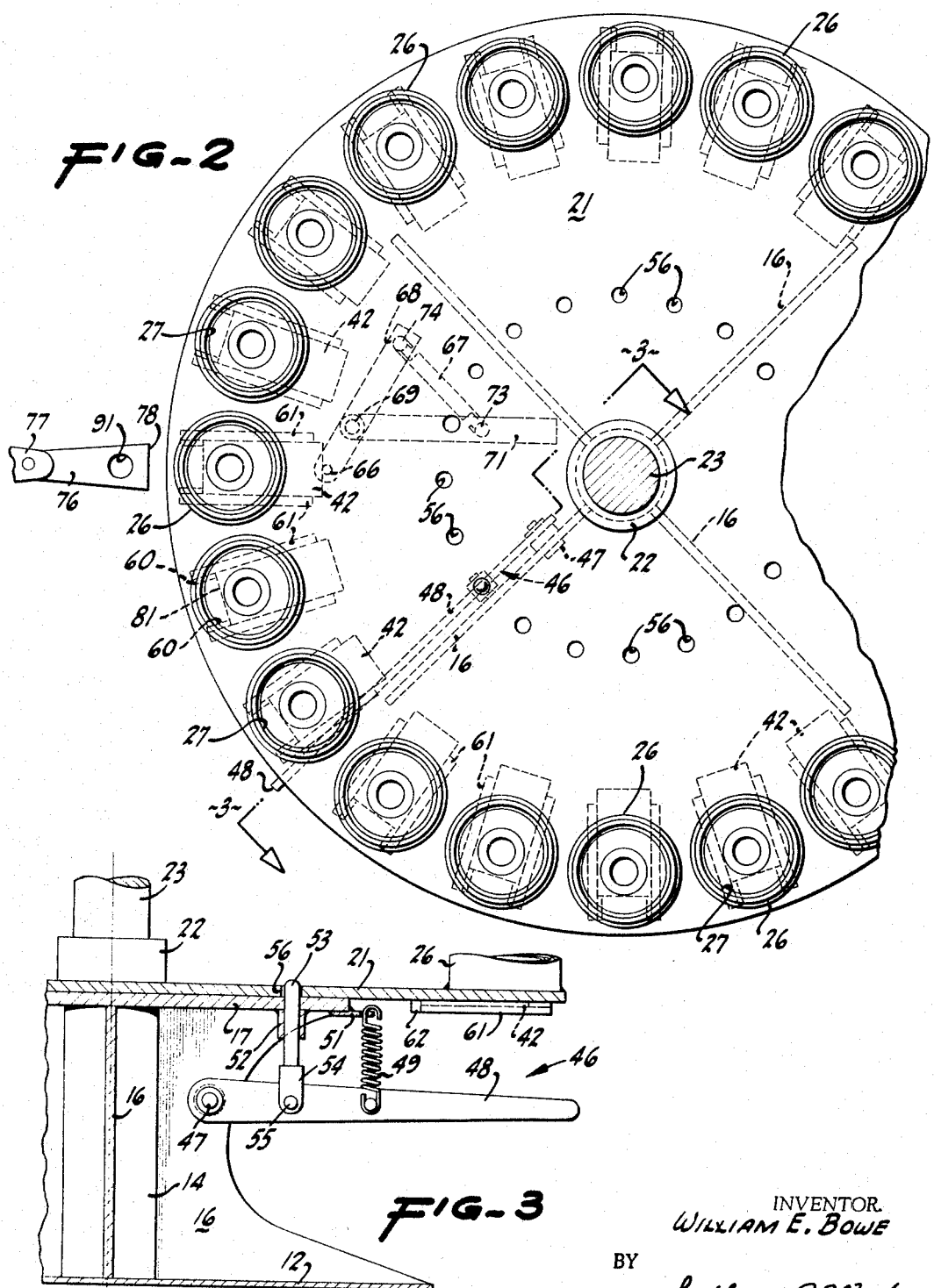
INVENTOR.
WILLIAM E. BOWE
BY
Lothrop & West
ATTORNEYS

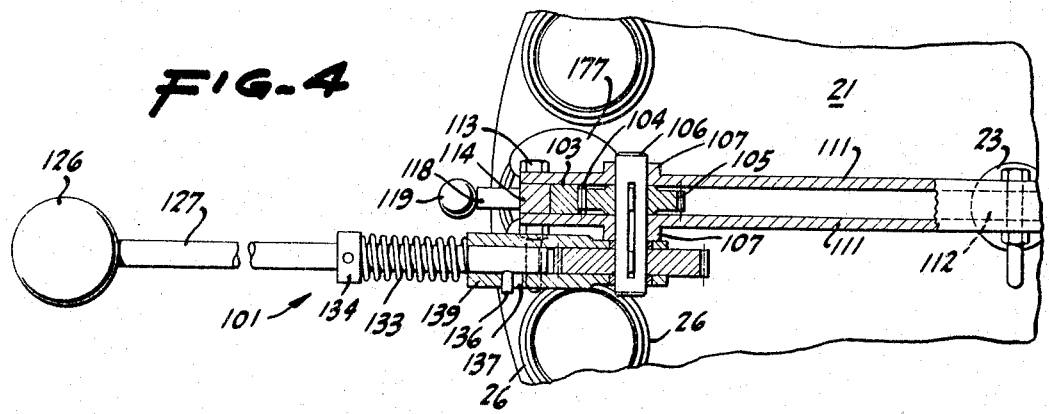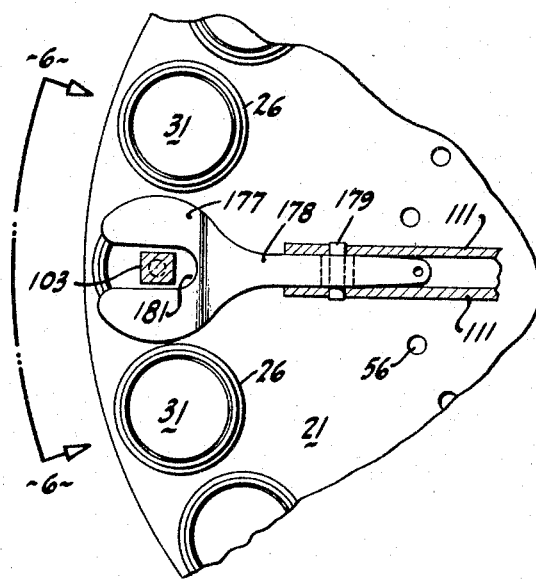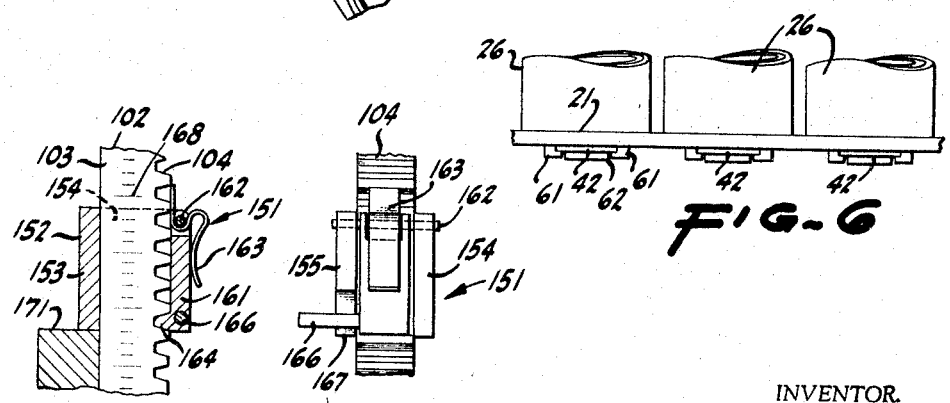

United States Patent Office 3,321,108
Patented May 23, 1967

3,321,108
PRINTING INK DISPENSER
William E. Bowe, 4510 Green Tree Drive,
Sacramento, Calif. 95823
Filed Nov. 26, 1965, Ser. No. 509,826
3 Claims. (Cl. 222—49)

ABSTRACT OF THE DISCLOSURE

The disclosure includes a turntable provided with a plurality of upstanding cylindrical collars adapted to receive tubes of printing ink of various colors. Upon indexing the selected cylinder to a dispensing station, the desired amount of ink is ejected from the tube by a vertical plunger, the ejected ink flowing through a gate opened concurrently with the downward movement of the ink-ejecting plunger. Additional structure enables the operator to pre-set the desired amount of ink to be dispensed on the plunger stroke.

---

The invention relates to machines for dispensing predetermined quantities of printing inks of selected colors.

Printing inks of various colors are ordinarily sold in containers which are opened when it is necessary to remove a desired quantity of a needed color. After the required amount of ink is withdrawn, the container is usually again closed. However, a dry skin soon forms on the surface of the viscous ink fluid. This skin must be discarded and it is thereby wasted. Furthermore, it is often difficult to remove all of the ink from the container, resulting in still further waste.

An additional problem heretofore encountered by a pressman in a printing plant is that of selecting and mixing the various colored inks in precise quantities so as to match the desired color.

In the past it has been necessary for the pressman to withdraw estimated quantities of various colors, of which there are about twenty, weigh, record and mix the colors until a match is achieved. Thereafter, it is necessary to multiply the quantities of the components to obtain the amount necessary for the run. Different kinds of paper stock absorb variant amounts of ink. Consequently, in estimating the quantity which may be required for a given run, the estimate may fall short of the needed amount, in which case another batch must be mixed; if too great, the excess is wasted.

It is therefore an object of the invention to provide a printing ink dispenser which is capable of dispensing inks of twenty or more colors in precise, measured charges, thereby enabling the operator to determine his formula quickly and easily, and thereafter to mix any number of batches, as required, with the assurance of precise matching and color duplication.

It is another object of the invention to provide a printing ink dispenser which keeps the ink covered at all times, thereby eliminating the formation of a dry skin on the ink.

It is a further object of the invention to provide a machine for dispensing ink in which substantially all of the ink is removable from its container.

It is still a further object of the invention to provide a dispenser which is relatively economical, is compact in size and is long-lived and reliable in operation.

It is yet another object of the invention to provide a machine for dispensing fluids of a viscous nature and of differing colors, the use of which machine can readily be learned by the average person.

It is an additional object of the invention to provide a generally improved printing ink dispenser.

Other objects, together with the foregoing, are attained in the embodiment described in the following description and illustrated in the accompanying drawings in which:

FIGURE 2 is a fragmentary, horizontal sectional view, the plane of the section being indicated by the line 2—2 in FIGURE 1;

FIGURE 3 is a fragmentary, sectional view of the turntable indexing structure, the plane of the section being indicated by the line 3—3 in FIGURE 2;

FIGURE 4 is a fragmentary sectional view of the plunger actuating structure, the plane of the section being shown by the line 4—4 in FIGURE 1;

FIGURE 5 is a fragmentary sectional view of the tube hold-down structure, the plane of the section being shown by the line 5—5 in FIGURE 1;

FIGURE 6 is a fragmentary, side elevational view of the tubes and the subjacent cut-off plates as viewed from along the arcuate line 6—6 in FIGURE 5;

FIGURE 7 is a fragmentary, sectional view, to an enlarged scale, of the quantity gauge structure; and, FIGURE 8 is a rear elevational view of the quantity gauge structure, as viewed from the line 8—8 in FIGURE 1.

Figure 1:
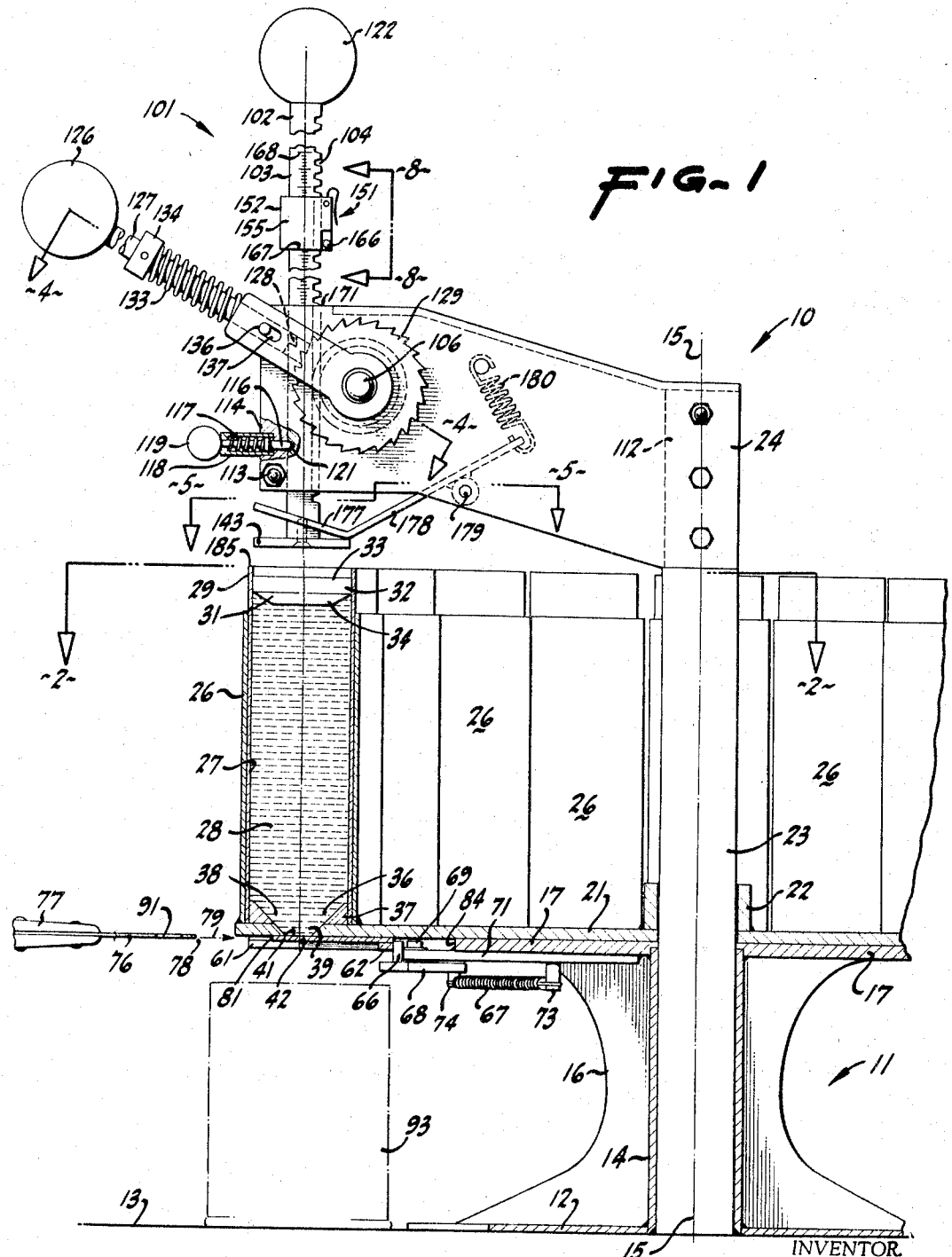
FIGURE 1 is a fragmentary, side elevational view, with portions being shown in section to reveal interior details.

While the printing ink dispenser of the invention is susceptible of numerous physical embodiments, depending upon the environment and requirements of use, substantial numbers of the herein shown and described embodiment have been made, tested and used, and all have performed in an eminently satisfactory manner.

The dispenser of the invention, generally designated by the reference numeral 10, comprises a base frame 11 including a bottom plate 12 supported on a suitable horizontal surface 13, such as is provided by a table or a bench.

Upstanding from the center of the bottom plate 12 is a tube 14 having a central vertical axis 15. Mounted above the lower end of the tube 14 and securely positioned thereon in a horizontal attitude by a plurality of radially disposed gussets 16, is a circular base plate 17 fabricated from sturdy metal plate material.

Supported on the base plate 17 for rotatable movement about the axis 15 is a turntable 21, the turntable also being of strong, metal plate material.

For even greater concentricity of motion of the turntable, the turntable is provided with a bushing 22 encompassing a circular-in-section post 23, the post being securely positioned within the tube 14 as by welding its lower end to the bottom plate 12. The vertical post 23 extends upwardly to an upper end portion 24 which serves as a strong support for structure subsequently to be described in detail.

The turntable 21 is customarily rotated by hand, in either direction so as to swing into a front and center, or indexed position, a selected vertical sleeve 26 mounted adjacent the periphery of the turntable, the sleeve 26 having disposed therein, a tube 27 containing printing ink 28 of a desired color.

The ink tube 27 is preferably of a disposable material, such as sized cardboard, and is painted on its outside walls with a color corresponding to the color of the contained ink. This ready indicia is easily observed by reference to the wall portion 29 of the tube projecting upwardly beyond the upper end of the sleeve 26.

The upper end of the tube 27 is closed by a plug 31, of wood or plastic material. The plug 31 includes both a disc portion 32 (initially located in the uppermost position indicated by the numeral 33) and a depending frusto-conical portion 34 disposed at all times in engagement with the ink, thus preventing formation of a dry skin on the ink's surface.

At the lower end of the tube, a crater 36 is formed by an annular member 37 placed in the tube at the time of manufacture. The crater walls are sloped to conform to the walls of the frusto-conical portion 34 of the plug 31 so that when the plug 31 is in bottom position, substantially all of the ink is ejected.

A closure member (not shown) initially seals the lower end of the tube. When a new tube is to be used, the closure member is removed and the tube is dropped downwardly into the empty sleeve 26. The ink, being quite viscous, does not run out through opened lower outlet 38 of the tube while the tube is dropping into place within the sleeve.

After the tube falls into place, the ink adjacent the lower tube opening 38 tends to commingle with any residual ink of the same color located within a tapered crater 39 formed in the subjacent turntable 21. It will be noted that the crater 39 forms a downward continuation of the crater 36, thus assuring an even more thorough discharge of all the ink within the tube as the plug 31 is fully urged to the bottom of the tube.

An orifice 41 at the bottom of the crater-like depression 39 formed in the turntable is normally covered by a slidable plate 42, termed a cut-off plate. With the cut-off plate in its normal closed position, as shown in FIGURE 1, the ink is protected from the oxidizing and drying effects of the atmosphere, and is also retained within the tube, the snug, face to face engagement between the top surface of the cut-off plate and the bottom surface of the turntable being most effective, in conjunction with the viscous nature of the ink, to prevent the escape of any ink.

As appears most clearly in FIGURE 2, there is a plurality (ordinarily 20) of the sleeves 26 and the ink tubes disposed around the periphery of the turntable 21. Each tube contains an ink of a different color.

As is also clearly shown in FIGURES 2 and 6, each of the tubes is provided at the bottom by a slidable cut-off plate 42.

Before proceeding with a description of the operation of the cut-off plate 42, details will first be given concerning the construction and operation of the tube indexing mechanism, designated by the reference numeral 46 and shown most clearly in FIGURE 3.

Pivotally mounted on a pin 47 secured to a gusset 16 is a lever 48 biased in an upward direction by a tension spring 49 attached to an extension 51 on the stationary base plate 17. Slidably disposed in a bushing 52, mounted on the base plate 17, and projecting upwardly through the base plate 17 is an index pin 53, the index pin 53 upstanding from a clevis 54 pivotally mounted on a pivot pin 55 on the lever 48. With the lever 48 in the customary position shown in FIGURE 3, the upper end of the index pin 53 projects upwardly into a selected one of a plurality of openings 56 formed in the turntable on a common circle (see FIGURE 2).

Thus, when it is desired to index a tube containing ink of a desired color, it is only necessary to depress the lever 48 far enough to disengage the upper end of the index pin 53, rotate the turntable until the desired tube is in indexed position, and release the lever 48 to allow the index pin to lift under spring urgency and engage the walls of the corresponding opening 56.

In the device illustrated herein, the particular tube which has been indexed preparatory to withdrawing ink therefrom is termed the operative tube and is indicated at 9:00 o'clock in FIGURE 2. In other words, whereas the indexing mechanism 46 is located at approximately 7:30 o'clock in FIGURE 2, the operative tube is displaced forwardly therefrom, to a position of about 270°, or 9:00 o'clock.

Referring to FIGURES 1, 2 and 6, it can be seen that the cut-off plate 42 sealing the bottom of each of the tubes, including the operative ink tube, is radially slidable in a pair of parallel, spaced tracks 61 mounted on the bottom of the turntable 21. Outward radial movement of the cut-off plate 42 is limited by abutment of the plate with a pair of stop blocks 60 (see FIGURE 2) mounted adjacent the outer ends of the tracks 61.

The cut-off plate 42 is urged in a radially outward direction by a vertical pin 66 bearing against a transverse cleat 62 mounted on the inner end of the plate 42.

The pin 66, in turn, is biased outwardly by a tension spring 67 acting on one end (see FIGURE 2) of a lever 68 pivoted on a fulcrum pin 69, the other end of the lever 68 having the urgency pin 66 mounted thereon.

As appears most clearly in FIGURES 1 and 2, the pin 66 biasing structure is mounted on an arm 71 secured to the fixed base plate 17, with one end of the spring 67 being anchored to the pin 73 on the arm 71 and the other end anchored to the pin 74 on the arm 68.

Having now described the cut-off plate mechanism and its manner of operation, it becomes apparent that in order to uncover the aperture 41 in the turntable underlying the operative tube, the cut-off plate 42 must be translated inwardly against the outward bias afforded by the spring-urged pin 66. This outward bias is overcome by the inward force of a straight-ended knife blade 76 mounted on a handle 77 held by the pressman. The transverse, linear edge 78 of the blade 76 is moved inwardly in the direction indicated by the arrow 79 in FIGURE 1 until it abuts the corresponding linear edge 81 of the cut-off plate 42. Further inward movement of the knife blade 76 translates the cut-off plate 42 inwardly, thus uncovering the opening 41.

Inward movement of the knife blade 76 is limited to a predetermined amount, as, for example, by the abutment (see FIGURE 2) between the fulcrum pin 69 and the adjacent margin 84 (see FIGURE 1) of the base plate 17, located at approximately 9:30 o'clock.

Suitable structure (not shown) is provided to stop inward movement of the cut-off plate at a predetermined location such that as inward movement of the cut-off plate is halted, an orifice 91 in the knife blade is in registry with the aperture 41 in the turntable. The orifice 91 in the knife blade and the aperture 41 in the turntable have approximately identical areas. Thus, as ink is discharged from the tube, the ink flows through the two registering openings and is directed downwardly into the underlying container 93 (see FIGURE 1).

Then, after the desired amount of ink is discharged, the knife is withdrawn. The spring-biased pin 66 thereupon acts upon the cut-off plate 42 and the plate returns to its normally closed, or cut-off, position.

Attention is now directed to the mechanism for discharging the ink in the operative tube in precise quantities.

This mechanism, generally designated by the reference numeral 101, comprises a vertically movable plunger 102 conveniently formed of a rectangular-in-section stem 103 having the inner side thereof machined to provide a toothed rack 104 adapted to engage with a pinion 105. The pinion 105 is mounted on a shaft 106 journalled in a bushing 107 so that when the shaft 106 is rotated, the rack 104 and the plunger 102 are vertically translated.

The plunger 102 is carried adjacent the outer end of a pair of arms 111 mounted on a vertical bar 112 forming the upper end portion 24 of the vertical post 23. The outermost ends of the arms 111 are secured together by fasteners 113, a spacer block 114 being interposed between the ends of the arms to provide a bearing surface for the outer vertical surface of the plunger stem 103.

As appears most clearly in FIGURES 1 and 4, a detent pin 116 is urged inwardly by a spring 117 within a housing 118 mounted on and projecting outwardly from the spacer block 114. A ball handle 119 on the outer end of the pin 116 enables the operator to withdraw the pin 116 from a recess 121 in the outer wall of the plunger stem 103 when the plunger is to be operated.

At the conclusion of the plunger's downward stroke, the plunger is lifted by grasping and lifting upwardly on the ball handle 122 on the upper end of the plunger. As the plunger is lifted to the position shown in FIGURE 1, the detent pin 116 is biased into the recess 121 and thus holds the plunger in uppermost position until the next cycle is commenced.

In order to depress the plunger, the shaft 106 is rotated in a counterclockwise direction, as viewed in FIGURE 1. This movement is effected by depressing the ball handle 126 on the end of a lever 127. The lever 127 is connected to the shaft 106 through a pawl 128 and ratchet wheel 129 mechanism.

The ratchet wheel 129 is coaxially mounted on the shaft 106, and thus the ratchet 129 rotates in unison with the shaft 106 whether the plunger moves downwardly or upwardly.

The lever and the pawl are effective to actuate the ratchet, however, only when the lever is urged axially inwardly at the same time it is swung downwardly. In other words, a compression spring 133 bears outwardly against a collar 134 mounted on the lever and thus biases the lever and the pawl axially outwardly so that normally the pawl 128 is disengaged from the ratchet teeth, as shown in FIGURES 1 and 4.

Outward movement of the lever and the pawl is limited by a pin 136 mounted transversely on the lever and constrained to move within a slot 137 formed in the side of a keeper housing 139 journaled on the shaft 106 by a bearing 141 (see FIGURE 4).

It can now be seen that in order to lower the plunger 102 so that the plunger head 143 on the bottom of the plunger stem 103 is brought into engagement with the top of the piston-like plug 31 covering the ink, it is only necessary for the operator to withdraw the detent pin, and, while concurrently holding the plunger handle 122, allow the plunger to move downwardly until the plunger head 143 touches the plug 31.

Then, in order to eject the viscous ink into the container 93 underlying the tube, the ink knife is grasped in one of the operator's hands, is inserted against the cut-off plate and is pushed inwardly until the aperture 91 in the knife blade is in registry with the opening 41 in the turntable.

Concurrently, the operator, with his other hand, grasps the lever handle 126, and pushes axially inwardly until the pawl 128 engages the ratchet. He then pulls downwardly on the lever handle, causing the plunger head to press firmly downwardly against the plug which, acting in the nature of a floating piston, urges the ink downwardly and ejects a desired quantity of ink into the container 93.

As soon as the desired quantity has been ejected, the ink knife is withdrawn, thus allowing the cut-off plate to re-seal the opening. The plunger is then lifted until it is re-engaged by the detent mechanism, awaiting the next cycle.

As an important feature of the invention, means are provided for gauging the precise amount of ink to be ejected.

Having first lowered the plunger head 143 into engagement with the plug 31, the gauge mechanism, generally designated by the reference numeral 151, is brought into use.

The gauge mechanism 151 comprises a hollow rectangular-in-section collar 152, or channel, having three walls, namely, an outer wall 153 and a spaced pair of side walls 154 and 155, the walls enclosing the corresponding three side surfaces of the plunger stem 103 with a sliding fit. The inner, or rack, surface 104 of the plunger stem 103 is covered by a swingable latch plate 161 pivotally mounted adjacent its upper end on a pivot pin 162 extending transversely between the side walls 154 and 155. A suitable leaf spring member 163 urges the lower end of the latch plate 161 toward the rack and, more particularly, urges a tooth 164 on the lower end of the latch plate into engagement with the rack, as appears most clearly in FIGURE 7.

In setting the gauge, the operator grasps between his thumb and finger a transverse pin 166 mounted on the lower end of the latch plate 161 and swings the pin 166 in a counterclockwise direction (as viewed in FIGURES 1 and 7), thus disengaging the latch tooth 164 from the rack and permitting the gauge to be slid up or down on the plunger stem 103 until the lower end 167 of the side wall 155 (see FIGURE 1) is in registry with the desired one of the quantity indicia 168 scribed on the adjacent side surface of the plunger stem.

The bench mark, or base mark for the indicia is located at the top surface 171 of the radial supporting arm 111, the surface 171 being horizontal and located adjacent the outer portion of the arm, as appears in FIGURES 1 and 7.

Thus, with the plunger head 143 resting on top of the ink plug 31, the operator notes the particular one of the indicia in registry with the top surface 171. Then, counting upwardly from the surface 171 a predetermined number of the scribe marks of the indicia, the gauge is slid upwardly or downwardly until the lower margin 167 of the gauge member is in registry with the selected one of the scribe marks of the indicia. Any convenient scale can be used for the indicia, such as ounces, or tenths or hundredths of a pound, or grams, these quantities corresponding to the amount of ink to be ejected.

With the gauge in its proper position above the surface 171, as in FIGURE 1, the plunger is thereupon lowered in the manner previously described, with the bottom outlet opening 41 uncovered by use of the ink knife. Lowering of the plunger continues until the bottom end of the gauge abuts the surface 171 as is shown in FIGURE 7.

At this juncture, further downward pressure on the plunger is ceased and the plunger is returned, as previously explained, to its uppermost position.

Since the plunger in its downward movement, traverses the distance previously set on the gauge indicia, the desired quantity of ink is thereby dispensed. As will be apparent, the indicia are marked in dependence upon the inner diameter of the ink tube and can be scaled to any desired degree of accuracy.

The turntable is thereupon rotated until the next desired color of ink is brought into indexed position and, depending upon the formula of the mix, the gauge is reset to reflect the desired quantity of the new ink and the cycle is repeated.

Inasmuch as the bottom end of the ink tube fits quite snugly against the subjacent top surface of the turntable (see FIGURE 1) there is small likelihood that the hydrostatic pressure exerted by the viscous ink would be able to exert a sufficient upward force on the tube to lift the tube walls as the plunger is lowered. In other words, the seal between the bottom horizontal surface of the crater ring 37 and the subjacent annular surface of the turntable is such that ink is not apt to flow between these interfaces and exert an upward hydrostatic force on the bottom surface of the crater ring so as to lift the tube.

Against this contingency, however, I have provided a tube hold-down structure comprising a hold-down plate 177, or foot-plate, angularly mounted on the lower end of a rocker arm 178 pivotally mounted on a cross-pin 179 spanning the radial arms 111, the upper end of the arm being biased upwardly by a tension spring 180.

The foot plate 177, as is shown most clearly in FIGURE 5, includes a central radial slot 181 to avoid interference with the plunger stem 103.

As the plunger is depressed from its uppermost position, as shown in FIGURE 1, the foot plate 177 rides downwardly with the plunger until the foot plate encounters the upper end 185 of the ink tube. At this juncture, the foot plate 177 is in a horizontal attitude. Then, under the downward urgency on the foot plate exerted by the spring 180, the foot plate presses downwardly on the tube, creating an even tighter seal between the tube and the turntable, and positively preventing any tendency of the tube to rise under the hydrostatic forces caused by the compression of the ink by the plunger.

It can therefore be seen that I have provided a printing ink dispenser which is not only reliable in operation but which also readily enables an operator to mix inks of many different colors with great precision.

What is claimed is:

1. A printing ink dispenser comprising:
   a. a frame including a horizontal base plate and a vertical post;
   b. a vertical plunger translatably mounted on said post;
   c. a turntable rotatably mounted on said base plate, said turntable including a plurality of openings around the turntable periphery and having mounted thereon, below each of said openings, means for selectively covering and uncovering said openings, said means comprising,
      (1) a spring-biased cut-off plate slidably mounted on said turntable for movement between a first location covering said opening and a second location removed therefrom, and,
      (2) a blade having an orifice substantially equal in area to the area of said opening, said orifice being disposed in substantial registry with said opening as said blade is urged against said cut-off plate and biases said cut-off plate from said first location to said second location;
   d. a plurality of vertical collars mounted around the periphery of said turntable, each of said collars having a diameter sufficient to receive a tube containing printing ink, each of the tubes having an outlet on the lower end in registry with a corresponding one of said openings; and,
   e. means for translating said plunger between a first position removed from a subjacent one of said ink tubes and a second position wherein said plunger enters said tube and ejects the printing ink therefrom through a registering one of said openings and through said orifice as said cut-off plate is biased to said second location.

2. The device of claim 1 further characterized by a spring-biased foot plate pivotally mounted on said post, said foot plate being movable between an upper location removed from the top of said tube and a lower location in engagement with the top of said tube in dependence upon the movement of said plunger between said first position and said second position.

3. The device of claim 1 further characterized by means adjustably mounted on said plunger for indicating the extent of vertical movement of said plunger relative to said post.

References Cited by the Examiner

UNITED STATES PATENTS

| | | | |
|---|---|---|---|
| 295,492 | 3/1884 | Grout | 222—136 |
| 901,061 | 10/1908 | Belcher | 222—327 |
| 1,015,395 | 1/1912 | Newton | 222—391 |
| 1,447,321 | 3/1923 | Powell et al. | 222—144 |
| 2,438,843 | 3/1948 | Correa | 222—391 |
| 2,665,823 | 1/1954 | Fossa | 222—144 X |
| 2,776,075 | 1/1957 | Etter | 222—49 X |
| 2,985,339 | 5/1961 | Fischer et al. | 222—47 X |
| 3,029,847 | 4/1962 | Baudhuin et al. | 222—144 X |
| 3,064,864 | 11/1962 | O'Neill | 222—309 X |
| 3,105,620 | 10/1963 | Atkins et al. | 222—561 X |

FOREIGN PATENTS 555,582  1/1957  Italy.

RAPHAEL M. LUPO, *Primary Examiner.*